United States Patent Office 3,597,364
Patented Aug. 3, 1971

3,597,364
OPTICAL BRIGHTENING AND NEW
COMPOSITIONS OF MATTER
Ichiro Okubo and Michihiro Tsujimoto, Tokyo, Japan, assignors to Mitsui Toatsu Chemicals, Incorporated, Tokyo, Japan
No Drawing. Continuation of application Ser. No. 772,873, June 14, 1968, which is a division of application Ser. No. 550,957, May 18, 1966, now Patent No. 3,400,124, which in turn is a continuation-in-part of applications Ser. No. 220,904, Aug. 31, 1962, now Patent No. 3.262,929, and Ser. No. 502,414, Oct. 22, 1965, now Patent No. 3,347,694. This application July 17, 1969, Ser. No. 847,512
Int. Cl. D06l 3/12
U.S. Cl. 252—301.2W        6 Claims

ABSTRACT OF THE DISCLOSURE

Optical brightening compositions and brightened products are disclosed involving the use of 2-styrylnaphthoxazole and various styryl-substituted derivatives. The compositions are especially directed to improving fibers, fabrics, and the like.

---

This application is a continuation of application Ser. No. 772,873, filed June 14, 1968, now abandoned, which in turn is a division of application No. 550, 957, filed May 18, 1966, now Pat. No. 3,400,124, issued Sept. 24, 1968, which in turn is a continuation-in-part of our prior applications Ser. No. 220,904, filed Aug. 31, 1962 now Pat. No. 3,262,929, issued July 26, 1966, and Ser. No. 502,414, filed Oct. 22, 1965 now Pat. No. 3,347,694, issued Oct. 17, 1967.

This invention relates to improvements in the field of optical brighteners (sometimes referred to as optical or bleaches). More especially, this invention involves the discovery that certain 2-styrylnaphthoxazoles, hereinafter more fully described, are remarkably effective for the optical brightening of a wide variety of materials, both natural and synthetic, and to the said naphthoxazoles themselves as materials not known as described herein prior to this invention. The said naphthoxazoles may be employed in brightening compositions whether aqueous or in a solvent, and as such, the compositions are employable under high temperature conditions without degradation of the brighteners per se. Not only are the said naphthoxazoles temperature-stable, but they may be employed in the presence of other material commonly included as brightening compositions, e.g. hypochlorite, without impairment. The said naphthoxazoles may be included as a component of polymer melts and processed therewith to products of whatever variety, thereby providing their brightening effects in such products. Similarly the said naphthoxazoles may be applied by way of solution to the surface of solid products of polymeric substrates. The described brightening agents are included in the compositions in an amount sufficient to exert optical brightening effects in the environments of their use.

As indicated above, the said naphthoxazoles may be applied to a wide variety of materials including wool, silk, cotton and to various synthetic materials. Their general applicability is therefore quite exceptional when compared to other known brighteners. Also, their stability renders them highly unusual. Further, as indicated above, the said naphthoxazoles may be applied to the various materials regardless of their form; however, they are especially important and useful in the treatment of natural organic fibrous and synthetic filamentary materials. Materials treated according to this invention are rendered excellently light fast.

From the foregoing, it will be appreciated that the new materials of this invention are outstanding in many respects in addition to their intrinsic brightening power, which will be seen more fully hereinafter. Moreover, as will appear, certain of the said naphthoxazoles are superior to others and also as regards their effectiveness on particular substrates.

The novel 2-styrylnaphthoxazole compounds of this invention have the structure represented by the general formula:

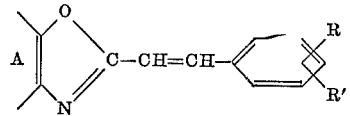

wherein A is an unsubstituted naphthalene ring, which is condensed with the oxazole ring, and R and R' are selected from hydrogen, halogen, cyano group, carboxyl group and its ester residue, alkyl group and aryl group.

Examples of novel 2-styrylnaphthoxazole compounds of this invention are shown below in Table I.

TABLE I

| No. | Structural formula | Property and melting point | Fluorescence in benzene solution |
|---|---|---|---|
| 1 | | Colorless flake-like crystals, 124–125° C. | Blue-violet. |
| 2 | | Slightly yellow pillar-like crystals 134–135° C. | Blue. |

TABLE I—Continued

| No. | Structural formula | Property and melting point | Fluorescence in benzene solution |
|---|---|---|---|
| 3 | naphthoxazole-C—CH=HC—C₆H₅ | Light yellow pillar-like crystals, 122–123° C. | Green-blue. |
| 4 | naphthoxazole-C—CH=HC—C₆H₄-Cl (ortho) | Slightly yellow needle-like crystals, 158–159° C. | Blue-green. |
| 5 | naphthoxazole-C—CH=HC—C₆H₄-Cl (meta) | Light yellow flake-like crystals, 114–115° C. | Blue. |
| 6 | naphthoxazole-C—CH=HC—C₆H₄—Cl | Yellow needle-like crystals, 159–160° C. | Green-blue. |
| 7 | naphthoxazole-C—CH=HC—C₆H₄—F | Light yellow pillar-like crystals, 125–126° C. | Violet-blue. |
| 8 | naphthoxazole-C—CH=HC—C₆H₄—Br | Greenish yellow pillar-like crystals, 185–186° C. | Blue-green. |
| 9 | naphthoxazole-C—CH=HC—C₆H₄—CH₃ | Light yellow flake-like crystals, 123–124° C. | Violet-blue |
| 10 | naphthoxazole-C—CH=HC—C₆H₄—COOH | Yellow long flake-like crystals, >300° C. | Blue. |

The preparation of the said naphthoazoles is described in our said prior application to which reference may be had in this connection.

As shown in Table I, the novel 2-styrylnaphthoxazole compounds used according to this invention are soluble in the organic solvent and the solutions exhibit strong fluorescence of blue violet to violet in day-light and in ultra violet light.

The organic fibrous materials to be treated by the process of this invention can include natural fibres such as silk and wool, and man-made fibres. It is particularly remarkable that brightening effect is superior on the man-made fibrous materials such as polyester, polyacrylonitrile, polyamide, acetalized polyvinyl alcohol and polyolefin and cellulose acetate fibres, and light fastness on these materials is excellent.

The treatment of the various fibrous materials under the process of this invention can be carried out according to the well known dyeing process, which is common in the case of the disperse dye, for instance, the novel 2-styrylnaphthoxazole compounds are dispersed in water by addition of surface-active agents and the fibrous materials are immersed in the prepared dispersed system. As available surface-active agent, there are either anionic or nonionic compounds such as alkyl benzene sulfonic acid and the condensation product of naphthalene sulfonic acid and formaldehyde or polyoxyethylenealkylether and the like.

The treatment temperature in the dispersed system may vary between 50° C. and 130° C. depending on the kind of the fibrous materials to be treated.

It is of advantage when the textile materials of polyester fibre are treated by the above process to add a carrier such as trichlorobenzene or methylsalicylate in the bath, as the brightening effect can be much improved.

It is also of particular advantage, especially when the textile materials of polyester or blended fabrics of polyester and cotton are treated in the form of fabrics, to apply the dry heating at between 160° C. and 220° C. for a time in the range of 2 to 0.5 minutes, according to the so-called thermosol process.

According to the process of this invention, it is also possible for the optical brightening of the man-made fibrous materials to add the said compound to spinning mass before the spinning thereof.

The amount of the novel 2-styrylnaphthoxazole compounds to be used according to the invention is preferably between 0.02% and 0.4% based on the weight of material to be treated.

The compound No. 5 in Table I is made into aqueous dispersed system by using an anionic surface-active agent of alkylbenzenesulfonic acid type, and when the above-mentioned man-made fibres are treated in a treating bath which is prepared in such a way as the amount of this compound is 0.1% or 0.2% to the weight of the materials to be treated, an excellent optical brightening effect can be obtained as to each of the fibres. The treating conditions and the light-fastness (according to Japanese Industrial Standard L1045–1959, Xenon light source) in this case are shown in Table 2.

TABLE 2

| Fiber materials | Compound concentration (percent) | Treatment temperature (° C.) | Treatment time (min.) | Light fastness |
| --- | --- | --- | --- | --- |
| Polyester | 0.2 | 120 | 45 | 4 |
| Polyacrylonitrile | 0.1 | 100 | 45 | 3 |
| Polyamide | 0.1 | 80 | 45 | 3 |
| Cellulose acetate | 0.1 | 80 | 45 | 3–4 |
| Acetalized polyvinyl alcohol | 0.1 | 80 | 45 | 3 |
| Polypropylene | 0.1 | 100 | 45 | 2–3 |

It is convenient to use a composition which is previously mixed with a surface-active agent in order to treat organic fibrous material by using the compound of this invention. For example, a composition comprising 10 parts of 2-styrylnaphthoxazole compound of this invention. 10 parts of surface-active agent of alkylbenzene sulfonic type and 80 parts of formaldehyde condensate of naphthalene sulfonic acid can be conveniently used.

The invention is further illustrated by the following examples. Percents and parts hereinafter are by weight.

EXAMPLE 1

One part of 2-(3'-chlorostyryl)-β-naphthoxazole of the formula

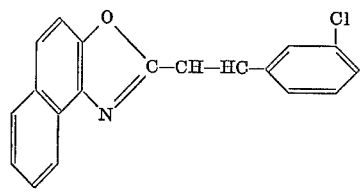

is thoroughly mixed with 9 parts of surface-active agent of alkylbenzene sulfonic acid type to give a sample, and 0.1 parts of the sample thus prepared per 10 parts of cellulose acetate fabrics to be treated is put into 400 parts of water to give an aqueous dispersion. In this aqueous dispersion the cellulose acetate fabrics are treated at 80° C. for 45 minutes. The treated fabrics are washed with water and dried. A remarkable brightening effect is obtained as compared with non-treated fabrics.

EXAMPLE 2

When nylon fabrics or "Vinylon," acetalized polyvinyl alcohol fabrics, are used in place of acetate fabrics in Example 1, a remarkable brightening effect similar to Example 1 is obtained.

EXAMPLE 3

When polypropylene yarn is used in place of acetate fabrics in Example 1 and treated at 100° C., a remarkable brightening effect similar to Example 1 is obtained.

EXAMPLE 4

0.1 part of the sample prepared in Example 1 is added to 400 parts of water to prepare an aqueous dispersion. To this dispersion is added 0.2 part of formic acid (85%) and then 10 parts of "Vonnel W," polyacrylonitrile fabric is treated in this bath liquid at 100° C. for 45 minutes. The treated yarn is washed with water and dried. A remarkable brightening effect similar to Example 1 is obtained.

EXAMPLE 5

When polyester fabrics is used in place of acetate fibres in Example 1 and treated at 120° C., a remarkable brightening effect similar to Example 1 is obtained.

EXAMPLE 6

When 2-styryl-β-naphthoxazole of the formula

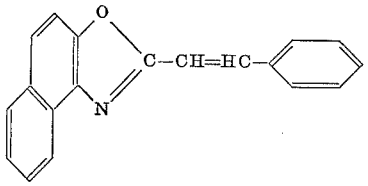

is used in place of 2 - (3'-chlorostyryl)-β-naphthoxazole in Example 5, a remarkable brightening effect is obtained.

EXAMPLE 7

A concentrated suspension is previously prepared by mixing 1 part of 2-(4'-chlorostyryl)-β-naphthoxazole of the formula

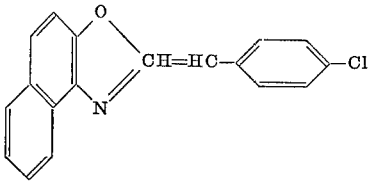

2 parts of the surface-active agent of polyoxyethylene-alkylether type and 7 parts of water.

A bath liquid is prepared by diluting the above concentrated suspension so as to make the concentration of the 2-styrylnaphthoxazole compound to be 0.2%.

"Tetron" polyester fabrics are immersed in the bath at room temperature, then squeezed out to a liquid content of 50%, dried at room temperature and subjected for 60 seconds to a further heat treatment in an air bath which is kept at 200° C. The fabrics are washed in hot soap solution and rinsed. The dried fabrics are particularly brightened as compared with the untreated materials.

As indicated above, the compounds of the present invention differ in their effectiveness. For example, referring to Table I Compound No. 5 is found to be greatly superior to Compound No. 3, especially in the treatment of spun polyester cloth. The difference may be clearly perceived with the naked eye. Table 3 below sets forth data in this connection.

TABLE 3.—COMPARISON OF BRIGHTENING EFFECTS ON SPUN POLYESTER CLOTHS [1]

| Treatments [2] | Compound No. 3 | Compound No. 5 |
|---|---|---|
| 100° C.: | | |
| 0.05% | 78.0 (100.0) | 78.5 (100.6) |
| 0.2% | 92.5 (100.0) | 97.5 (105.4) |
| 120° C.: | | |
| 0.05% | 78.1 (100.0) | 81.6 (104.5) |
| 0.2% | 93.3 (100.0) | 99.9 (104.8) |

[1] Specific fluorescent intensity of the treated cloths.
[2] Amount (percent) of brightener used (o.w. fibre).

The treatments involved in Table 3 were carried out as follows:

500 mg. of fluorescent brightener were dispersed in 100 ml. of dimethylformamide, and 50 ml. of the resultant solution were poured into 450 ml. of 1% aqueous solution of polyoxyethylenealkylether-type nonionic surfactants under stirring, and the mixture was kept as the stock solution. Using 5 ml. or 20 ml. of the stock solution, 250 ml. of the treating liquid (bath) containing 500 mg. of sodium alkylbenzenesulfonate-type surfactant was prepared, and in the said treated solution 5 g. of spun polyester cloths were treated at 100° C. and 120° C. for 40 minutes.

The treated cloths thus obtained were washed with water and then air dried.

Nylon and acetate cloths were comparatively treated with the said compounds, i.e., Compounds 3 and 5. This treatment was at 80° C. using the same technique as in the case of polyester cloth. Fluorescent intensity measurements show high effectiveness, especially as regards Compound No. 5.

In respect to the additive effect of 2-styrylnaphthoxazole compounds to detergents, the additive effect of Compound 3 (employed in the form of finely dispersed solution as mentioned hereinbefore) is discussed below, wherein surfactants used are composed of typical heavy duty systems for washing machines as shown in Table 4.

TABLE 4

Composition of heavy duty detergents

| Components: | Composition in percent |
|---|---|
| Sodium alkylbenzene sulfonate | 33.0 |
| Sodium tripolyphosphate | 31.0 |
| Sodium silicate | 5.0 |
| CMC (carboxymethylcellulose) | 0.8 |
| Sodium sulfate | 30.2 |

Treating liquids (liquor ratio 1:50) containing 1% O.W.F. of Compound No. 3 were prepared to provide 0.25 and 5 g./liter of heavy duty detergent.

Unbleached muslin and nylon-taffeta were treated one and five times by each fresh bath (liquid), and washed with water. After air-drying, the relative fluorescent intensities were determined.

The launder-O-meter (having ten steel balls, 42 r.p.m.) was employed for the treatments and the experiments were carried out at 40° C. for 30 minutes. Excellent brightening effects are provided, especially in the treated nylon cloths.

The other compounds herein disclosed may be similarly applied in detergent compositions.

We claim:

1. A composition of matter comprising organic polymeric material selected from the group consisting of polyesters, polyamides, acetalized polyvinyl alcohol, cellulose acetate, and polyolefins as a substrate and a 2-styrylnaphthoxazole compound represented by the formula:

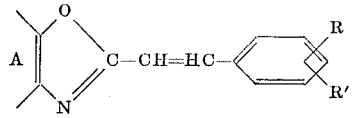

wherein A is an unsubstituted naphthalene ring, which is condensed with the oxazole ring, and wherein R and R' are selected from hydrogen, halogen, cyano group, carboxyl group and its lower alkyl ester residue, lower alkyl group and phenyl group, in quantity sufficient to impart measurable brightening effects to the said material.

2. A composition of matter comprising organic polymeric material selected from the group consisting of polyesters, polyamides, acetalized polyvinyl alcohol, cellulose acetate, and poloyolefins as a substrate, at least the surface of which has been treated with a 2-styrylnaphthoxazole compound represented by the formula:

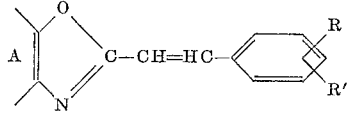

wherein A is an unsubstituted naphthalene ring, which is condensed with the oxazole ring, and wherein R and R' are selected from hydrogen, halogen, cyano group, carboxyl group and its lower alkyl ester residue, lower alkyl group and phenyl group, and wherein measurable optical brightening effects are imparted thereto.

3. A composition of matter comprising organic polymeric material selected from the group consisting of polyesters, polyamides, acetalized polyvinyl alcohol, cellulose acetate, and polyolefins as a substrate, and the compound 2-(3'-chlorostyryl)-β-naphthoxazole in quantity sufficient to impart measurable brightening effects to the said material.

4. A composition of matter comprising organic polymeric material selected from the group consisting of polyesters, polyamides, acetalized polyvinyl alcohol, cellulose acetate, and polyolefins as a substrate, at least the surface of which has been treated with the compound 2(3'-chlorostyryl)-β-naphthoxazole whereby measurable optical brightening effects are imparted thereto.

5. A composition of matter comprising organic polymeric material selected from the group consisting of polyesters, polyamides, acetalized polyvinyl alcohol, cellulose acetate, and polyolefins as a substrate, and the compound 2-styryl-β-naphthaoxazole in quantity sufficient to impart measurable brightening effects to the said material.

6. A composition of matter comprising organic polymeric material selected from the group consisting of polyesters, polyamides, acetalized polyvinyl alcohol, cellulose acetate, and polyolefins as a substrate, at least the surface of which has been treated with the compound 2-styryl - β - naphthoxazole whereby measurable optical brightening effects are imparted thereto.

References Cited

Beilstein: Handbuck der Organische Chemie, vol. 27, 4th ed., Main Work, pp. 83–84, 1937.

TOBIAS E. LEVOW, Primary Examiner

A. P. DEMERS, Assistant Examiner

U.S. Cl. X.R.

117—33.5T; 260—240CA